US009137630B2

(12) United States Patent
van Deventer et al.

(10) Patent No.: US 9,137,630 B2
(45) Date of Patent: Sep. 15, 2015

(54) PROXY SERVERS IN DEVICE IDENTIFICATION SYSTEMS

(75) Inventors: Mattijs Oskar van Deventer, Leidschendam (NL); Victor Bastiaan Klos, The Hague (NL); Jeroen Laarakkers, Nootdorp (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 36 days.

(21) Appl. No.: 13/321,865

(22) PCT Filed: May 21, 2010

(86) PCT No.: PCT/NL2010/050310
§ 371 (c)(1),
(2), (4) Date: Mar. 6, 2012

(87) PCT Pub. No.: WO2010/134816
PCT Pub. Date: Nov. 25, 2010

(65) Prior Publication Data
US 2012/0158898 A1    Jun. 21, 2012

(30) Foreign Application Priority Data

May 22, 2009  (EP) .................................. 09160930
May 22, 2009  (EP) .................................. 09160934
Dec. 18, 2009  (EP) .................................. 09179950

(51) Int. Cl.
G06F 15/173    (2006.01)
H04W 4/02    (2009.01)
(Continued)

(52) U.S. Cl.
CPC ................ *H04W 4/02* (2013.01); *H04L 67/18* (2013.01); *H04L 67/327* (2013.01); *H04W 4/20* (2013.01)

(58) Field of Classification Search
CPC . H04L 61/1535; H04L 67/26; H04L 67/2833; H04L 67/28; H04L 67/2823; G06F 21/57; G06F 21/566; G06F 21/6281; G06F 2221/2115; G06F 2221/2141; G06F 17/30047
USPC .................................................. 709/224, 238
See application file for complete search history.

(56) References Cited

U.S. PATENT DOCUMENTS 7,092,370 B2 *   8/2006   Jiang et al. ..................... 370/329
7,611,057 B2 *  11/2009   Sakai et al. .................... 235/454
(Continued)

FOREIGN PATENT DOCUMENTS

JP    2007041632 A    2/2007
WO        03053007 A1    6/2003
(Continued)

OTHER PUBLICATIONS

International Search Report for PCT/NL2010/050310 dated Nov. 10, 2010.

*Primary Examiner* — Kevin Bates
*Assistant Examiner* — Clarence D McCray
(74) *Attorney, Agent, or Firm* — Banner & Witcoff, Ltd.

(57) ABSTRACT

A system (20) is designed for identifying devices (1, 2, . . . ) which are arranged for detecting a sensory identifier and transmitting request messages comprising representations of the detected sensory identifier. The system comprises at least one correlation relation server (e.g. 5C) for correlating representations received from the devices (1, 2) so as to match two or more of those devices, preferably when the devices (1, 2) are in each other's proximity. The system further comprises at least one proxy server (e.g. 8X) for routing a request message from a device (1, 2) to at least one correlation server (e.g. 5C), the routing being dependent on said representations or other information contained in the request messages.

15 Claims, 3 Drawing Sheets (51) Int. Cl.
*H04W 4/20* (2009.01)
*H04L 29/08* (2006.01)

(56) References Cited

U.S. PATENT DOCUMENTS

| | | | | |
|---|---|---|---|---|
| 7,653,655 | B2* | 1/2010 | Tokoro et al. | 455/41.2 |
| 8,001,232 | B1* | 8/2011 | Saulpaugh et al. | 709/224 |
| 8,073,447 | B2* | 12/2011 | Buckley et al. | 455/437 |
| 8,078,714 | B2* | 12/2011 | George et al. | 709/223 |
| 8,369,266 | B2* | 2/2013 | Jin et al. | 370/328 |
| 8,392,972 | B2* | 3/2013 | Manring et al. | 726/5 |
| 8,522,019 | B2* | 8/2013 | Michaelis | 713/168 |
| 8,917,631 | B2* | 12/2014 | Zivkovic | 370/259 |
| 2004/0117365 | A1* | 6/2004 | Schlageter et al. | 707/4 |
| 2005/0198265 | A1* | 9/2005 | Veprek et al. | 709/224 |
| 2005/0276394 | A1* | 12/2005 | Rossi et al. | 379/88.17 |
| 2006/0003785 | A1 | 1/2006 | Zatezalo | |
| 2007/0248093 | A1* | 10/2007 | Yamamura et al. | 370/392 |
| 2008/0043675 | A1* | 2/2008 | Mousseau et al. | 370/331 |
| 2008/0108308 | A1* | 5/2008 | Ullah | 455/41.2 |
| 2008/0160956 | A1* | 7/2008 | Jackson et al. | 455/406 |
| 2009/0037435 | A1* | 2/2009 | Fernandez et al. | 707/10 |
| 2009/0176505 | A1* | 7/2009 | Van Deventer et al. | 455/456.1 |
| 2010/0064041 | A1* | 3/2010 | Tays et al. | 709/224 |
| 2010/0174708 | A1* | 7/2010 | Ball et al. | 707/727 |
| 2013/0226324 | A1* | 8/2013 | Hannuksela et al. | 700/94 |
| 2014/0149514 | A1* | 5/2014 | Ryan et al. | 709/204 |

FOREIGN PATENT DOCUMENTS

| | | | | |
|---|---|---|---|---|
| WO | | 2009014438 A1 | 1/2009 | |
| WO | WO | 2009014438 A1 * | 1/2009 | H04M 1/725 |
| WO | | 2009036497 A1 | 3/2009 | |

* cited by examiner

PROXY SERVERS IN DEVICE IDENTIFICATION SYSTEMS

CROSS REFERENCE TO RELATED APPLICATIONS

This application is a National Stage application of co-pending PCT application PCT/NL2010/050310 filed May 21, 2010, which claims the benefit of EP application number 09160934.7 filed May 22, 2009, EP application number 09160930.5 filed May 22, 2009, and EP application number 09179950.2 filed Dec. 18, 2009. These applications are incorporated herein by reference in their entireties.

The present invention relates to a system for device identifications. More in particular, the present invention relates to a scalable system arranged for identifying devices, especially but not exclusively proximate mobile devices. Such a system may comprise at least one correlation server for correlating sets of identifications received from the devices, and at least one application server for carrying out an application in response to a correlated identification.

Mobile devices, such as mobile (cellular) telephones, PDAs (Personal Digital Assistants), laptop computers, and (portable) gaming consoles increasingly have multiple functions. Modern mobile telephones, for example, are not only suitable for making telephone calls but often also include a calculator, a calendar, and even games. Mobile phone games are typically designed for a single player, involving only the mobile device they are played on. However, some types of games require multiple players, each player using his/her own device. Before a multiple player game can begin, the players have to be selected and, accordingly, their mobile devices have to be identified.

It is possible to identify other mobile (or non-mobile) devices using a stored phone list containing the telephone numbers of other mobile devices and the respective names of their owners. However, the phone list contains no information regarding the availability and proximity of the other mobile devices. If a multiple player game is to be played with a group of players who are located in each other's vicinity, for example within viewing distance, the mobile devices of that group have to be identified in another way. Of course it is possible to manually enter the telephone numbers of participating mobile devices, if these numbers are known. However, this is cumbersome and prone to errors, in particular when the telephone numbers have to be read aloud.

Using Bluetooth© for identifying devices is also cumbersome. An elaborate procedure is required in which another device is selected from a so-called device discovery list and a password may be required to enable Bluetooth© pairing. This procedure is neither quick nor effortless.

Accordingly, there is a need for a simple yet effective identification mechanism for mobile devices located in each other's vicinity.

Such an identification mechanism can also be used in mobile devices other than mobile telephones, for example in PDAs, laptop computers and so-called notebook computers. An identification mechanism may not only be used in gaming applications, as PDAs and similar devices may in general need to identify other devices in order to initiate a transaction between the devices. An example of a transaction is exchanging information, such as data files, calendar appointments, and other information.

The identification mechanism would primarily be used for (mobile or non-mobile) devices which are located in each other's vicinity, as remote devices would not likely be involved in a multiple player game or data exchange. In particular, it is often desired to invite (the owner of) a device to join a game, to engage in gaming interaction, to exchange a data file, to exchange an electronic business card, to carry out a financial transaction or to exchange calendar data when (the owner of) the device is in view. For the invited device to join the game or exchange data, it first has to be identified. Accordingly, there is a need to automatically identify proximate devices and to subsequently activate a service, such as a game, involving the identified proximate devices.

International Patent Application WO2009/014438 (TNO/KPN) discloses a method of identifying proximate mobile devices by using sensory identifiers. The system of WO2009/014438, which may involve a server for verification and/or correlation, is very useful but is as such not scalable. That is, it is not possible to add one or more correlation servers without extensive modifications to the system.

It is an object of the present invention to overcome these and other problems of the Prior Art and to provide a system for identifying devices, for example a system according to WO2009/014438, which is scalable.

It is another object of the present invention to provide a scalable method for identifying devices.

Accordingly, the present invention provides a system for identifying devices arranged for detecting a sensory identifier and transmitting request messages containing representations of the detected sensory identifier, the system comprising at least one correlation server for correlating representations received from the devices so as to match two or more of those devices, characterised by at least one proxy server for routing a request message from a device to at least one correlation server, the routing being dependent on contents of the request messages.

By providing at least one proxy server for routing request messages to the at least one correlation server, the system has become scalable: it is now possible to add correlation servers without substantially altering the system. In addition, it is also possible to add devices without substantially altering the system. Accordingly, the system of the present invention is capable of accommodating a large number of users and user applications.

By making the routing dependent on contents of the request messages, these messages can be routed to selected correlation servers which may each be dedicated to a particular application or group of users.

In a preferred embodiment, each request message comprises the respective representation of the sensory identifier, and each request message further contains at least one of:
  a client identification for identifying a device,
  an application handle for identifying an application to be run by the device,
  a handling policy indication for identifying a handling policy, and/or
  a payload for conveying any additional information.

In addition to the representation of the sensory identifier, the request message may further contain one or more of the other information items listed above. The client identification identifies the user device which produced the request message and may serve to route request messages on the basis of a user group, while the application handle may serve to route request messages on the basis of the application to be run. The handling policy and the payload will typically be used for carrying out the user application.

In a further preferred embodiment, a request message may further comprise an event fingerprint which comprises a representation of environmental information, such as the temperature, at the location of the device which detected the sensory identifier and hence produced the respective representation of the sensory identifier and the associated request message, and at the time the sensory identifier was detected.

In other words, event fingerprints contain data describing an event. An event fingerprint may describe the production of a sound (clapping hands, two mobile devices touching), the production of an image (symbol, bar code, movement), or pressing a button. Event fingerprints, therefore, provide additional information relating to the event, in addition to the (representation of the) sensory identifier, and assist in determining which devices are in each other's proximity. Event fingerprints, may also include data concerning the air pressure and/or other parameters, A sensory identifier may for example comprises a sound, such as the sound of two devices touching, and/or an image, such as a symbol.

In addition to, or instead of a proxy server, a redirect server may be used. On the basis of the received information the redirect server sends a redirect message back to the device with the address(es) of the correlation servers to be polled. The system of the present invention may therefore further comprise a redirection server arranged for redirecting request messages back to the device while providing routing information.

The system of the present invention is preferably arranged for matching devices which are in each other's proximity, that is, for matching proximate devices. The devices to be matched are preferably, but not exclusively, mobile devices, such as mobile telephone devices.

The system of the present invention may further comprise at least one application server for carrying out an application involving matching devices. Such an application may be a game, an information service, or any other application. The at least one application server may be arranged for communicating with the devices through a correlation server.

The present invention further provides a proxy server for use in the system according to any of the preceding claims. The proxy server of the present invention is preferably arranged for routing request messages on the basis of information contained in those request messages, in particular, but not exclusively, representations of sensory identifiers.

The present invention also provides a method of identifying devices arranged for detecting a sensory identifier and transmitting request messages containing representations of the detected sensory identifier, the method comprising the step of correlating representations received from the devices so as to match two or more of those devices, characterised by the step of routing a request message from a device to at least one correlation server using at least one proxy server, the routing being dependent on contents of the request messages.

The present invention additionally provides a computer program product for carrying out the method as defined above. A computer program product may comprise a set of computer executable instructions stored on a data carrier, such as a CD or a DVD. The set of computer executable instructions, which allow a programmable computer to carry out the method as defined above, may also be available for downloading from a remote server, for example via the Internet. 15

The present invention will further be explained below with reference to exemplary embodiments illustrated in the accompanying drawings, in which.

Figure 1:
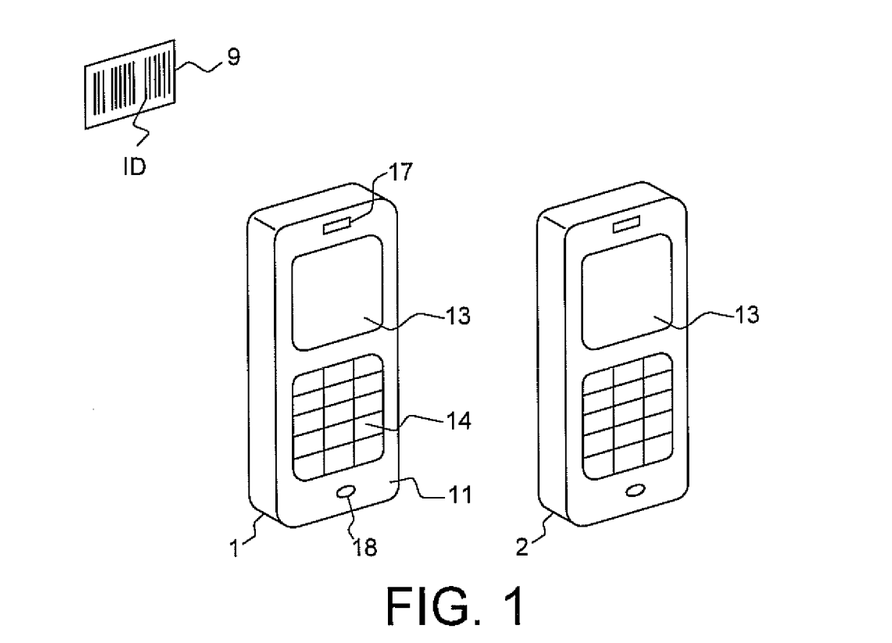
FIG. 1 schematically shows exemplary embodiments of devices and a sensory identifier as may be used in the present invention.

The set of devices shown merely by way of non-limiting example in FIG. 1 comprises a first device 1 and a second device 2, which may be referred to as client devices. In the example shown, the client devices are mobile (that is, portable) telephone devices arranged for mobile (that is, cellular) telephone services which may, however, also incorporate other functions, such as PDA (Personal Digital Assistant) functions.

Figure 2:
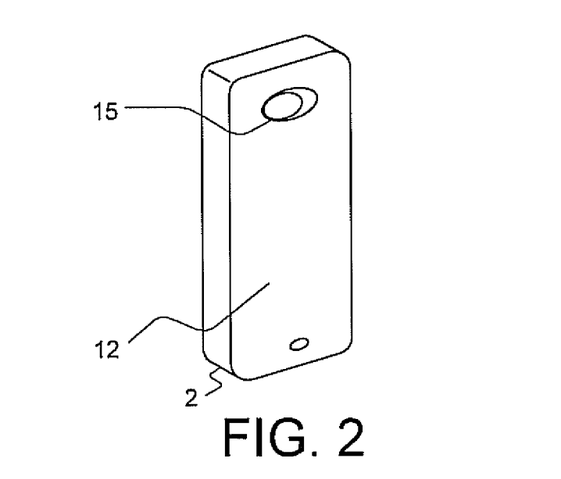
FIG. 2 schematically shows the back of an exemplary embodiment of a device as shown in FIG. 1.

Each mobile device 1, 2 has a front face 11 on which a display screen 13, a keypad 14, a loudspeaker 17 and a microphone 18 are arranged. It will be understood that the loudspeaker and/or the microphone may alternatively be arranged on a side face of the device. As shown in FIG. 2, each mobile device may have a bar code scanner or camera 15 arranged at its rear face 12.

The mobile devices 1, 2 are capable of detecting a sensory identifier. The merely exemplary sensory identifier ID shown in FIG. 1 is constituted by a bar code. This bar code may be "read" by a bar code scanner or a camera of a mobile device, as shown in FIG. 2.

A visual sensory identifier, such as a bar code or a symbol, may be applied on a sticker or label 9. Instead of a stationary spatial pattern, such as the regular bar code shown in FIG. 1, a temporal pattern may be used, such as a blinking pattern or symbol of which the frequency and/or time intervals contain the identifying information. Accordingly, the visual identifier may be constituted by a spatial and/or temporal pattern, for example produced by a display (such as an advertising display in a shop or shop window) or a light.

The sensory identifier may alternatively, or additionally, comprise an audio identifier, such as a sound signal. The audio identifier may be rendered by a loudspeaker of a device, or may be produced by a percussive element external to the device, such as a drum or a tuning fork. Alternatively, or additionally, the audio identifier may be produced by clapping hands or by tapping the (mobile) devices together. The sensory identifier may be accompanied by a time stamp, preferably indicating the "absolute" time ("wall clock time"). This allows sensory identifiers from multiple sources to be distinguished by using a maximum time delay between audio identifiers which are to correspond: if this time delay is exceeded, the audio identifiers are deemed not to be matching.

As stated above, an audio identifier may be produced by tapping the (mobile) devices 1 and 2 together. The tapping sound is received by the microphones 18 of both mobile devices. The audio identifier may alternatively be constituted by a sound signal produced by a loudspeaker (e.g. a loudspeaker 17 of the mobile devices shown in FIG. 1), the sound signal preferably consisting of multiple tones and/or pulses so as to be able to distinguish a plurality of different identifiers and/or time stamps.

Alternatively, or additionally, scent identifiers and/or touch identifiers may be used. The devices may, in such embodiments, be capable of detecting smells which are also detected by another device, or may be capable of sensing the surface of another object or device, the sensed surface containing touch identifiers, for example Braille symbols. Movement detectors for detecting (common) movements of the (mobile) devices may also be used. The present invention is therefore not limited to audio or visual identifiers.

The sensory identifiers, in the example of FIGS. 1 and 2 visual identifiers, serve to identify the devices when they are located in each other's proximity. The method of identifying serves to determine the identity of the other device, which identity may subsequently be used for exchanging information and/or playing games. More in particular, the method of identifying according to the present invention may comprise several steps, including the steps of a device detecting a sensory identifier (such as a bar code or an audio signal) and sending a request message associated with the sensory identifier to a server common to the devices. It is further possible to verify the detected identifier by comparing (a representation of) the identifier with a predetermined format, range or similar measure. Pattern recognition techniques may be used to match the detected identifier with a stored identifier format and/or to recognize the detected identifier.

Figure 3:
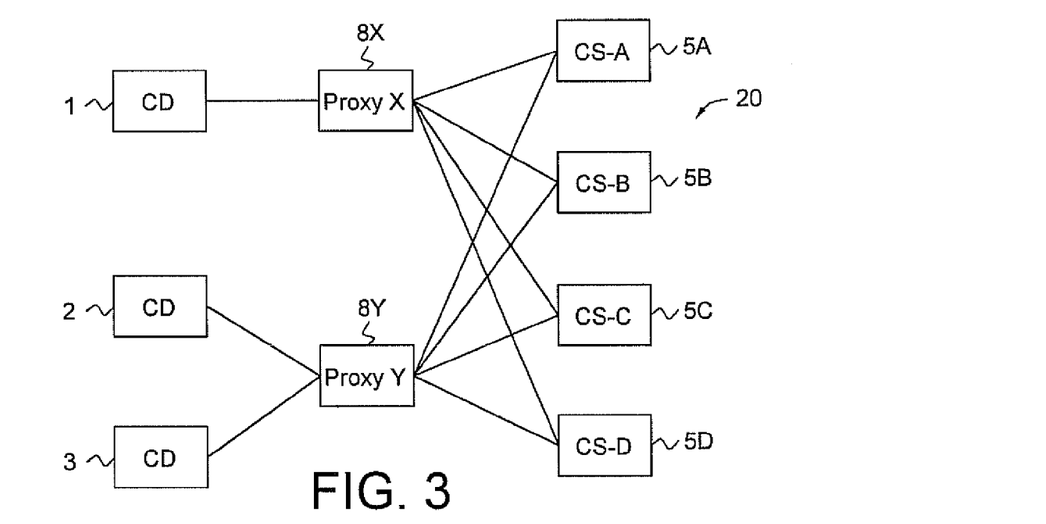
FIG. 3 schematically shows an embodiment of a system for identifying devices according to the present invention.

The system 20 shown merely by way of non-limiting example in FIG. 3 comprises client devices 1, 2 and 3, correlation servers 5A-5D and proxy servers 8X and 8Y. The client device (CD) 1, 2 and 3 are preferably mobile devices, such as mobile telephone devices suitable for a cellular telephone network, and are capable of communicating wirelessly with the proxy servers 8A and 8B.

The system 20 may further comprise one or more application servers (not shown) arranged for running an application, that is, application software suitable for carrying out a specific game or other function, such as the exchange of telephone numbers or generating a common tune. Application servers may be connected to the correlation servers and/or proxy servers, or may be integrated in the correlation servers so as to form combined servers which have both a correlation and an application function.

The correlation servers (CS) 5A-5D are designed to find matches between devices by correlating data received from those devices. The term "correlation" refers to establishing the correspondence between the data concerned, that is, determining whether the received data are related by means of comparison or other methods. Thus it can be determined, for example, whether the received data are related to the same event, such as the detection of a sound or symbol by the client devices. The data received from the devices preferably comprise the representations of identifiers, in particular sensory identifiers. In other words, the correlation function determines whether (sensory or non-sensory) identifiers and any other relevant data received from the client devices match. Explicit reference is made to International Patent Application WO 2009/014438, in which techniques are disclosed for identifying proximate devices, such as mobile telephone devices, using sensory identifiers.

In the embodiment shown in FIG. 3, each of the correlation servers 5A-5D is connected to each to each of the proxy servers 8X, 8Y. This is, however, not essential and in some embodiments not all correlation servers are connected to each proxy server. It will be understood that the number of client devices, proxy servers and correlation servers can be significantly greater than the number shown in FIG. 3. In some embodiments, for example, thousands of client devices may be involved.

The system 20 of the present invention allows detections of sensory identifiers and associated matching requests to be routed to a suitable correlation server (or, in some cases, to suitable correlation servers). By using proxy servers, the number of correlation servers and/or the number of client devices can be changed relatively easily. In addition, the use of proxy servers removes the requirement that all client devices should be able to communicate with all correlation servers.

Figure 4:
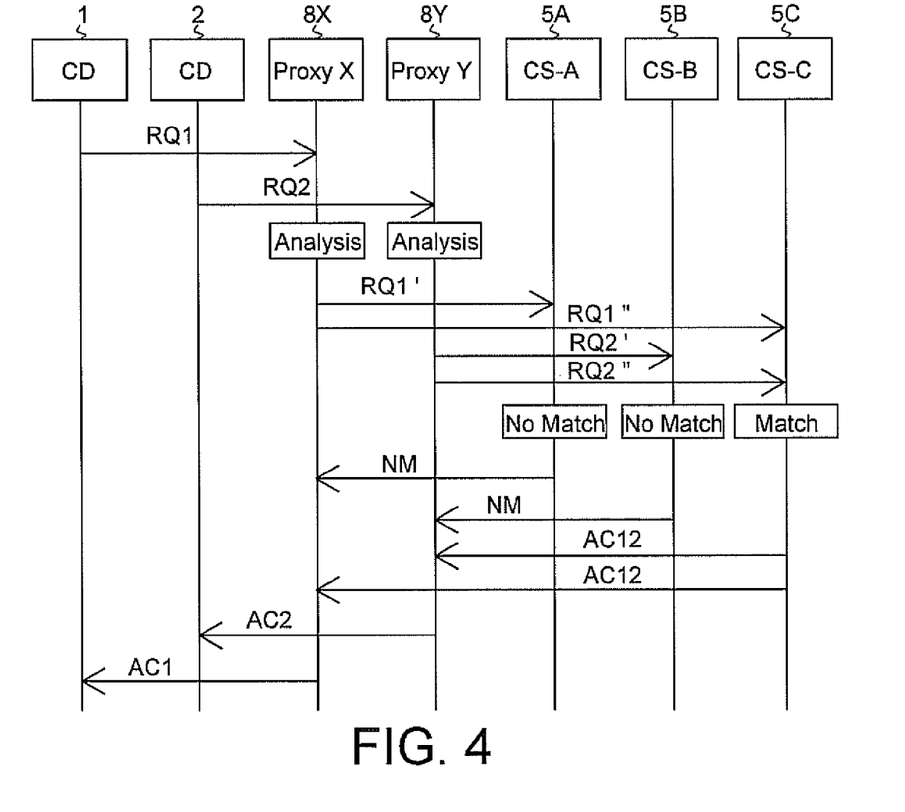
FIG. 4 schematically shows an exemplary exchange of messages in the system shown in FIG. 3.

The exchange of messages in the system 20 of FIG. 3 will be explained with reference to FIG. 4. For the sake of simplicity, only two client devices 1 and 2 are shown in FIG. 4, although a very similar scheme can be designed for three or more client devices.

The client devices 1 and 2 may produce request messages RQ1 and RQ2 which constitute match requests. These messages contain a representation of an identifier, and possibly also an identification of the devices. The message RQ1 may thus be written as:

RQ1={CI1, RE1, ... } where RQ1 is the request message produced by client device 1, CI1 is an identification of client device 1 (for example a unique device number or a telephone number), and RE1 is a representation of an identifier, preferably a sensory identifier.

It is noted that the representation of an identifier may be a string of digits or numbers representing the identifier. A bar code, as illustrated in FIG. 1, can for example be represented by a string of numbers. Similarly, a sound may be represented by its frequencies and time of occurrence, or by other parameters. In general, the representation will be a coded version of an identifier.

The (sensory) identifier can be produced by an event, such as the tapping together of two client devices, or by the detection of a symbol (such as a bar code) by the devices, and will be related to a "fingerprint" of the event: data which uniquely characterise the event. It can thus be seen that the correlation servers 5A-5C will preferably attempt to match the "fingerprints" of events detected by the client devices, in addition to attempting to match the (digital) representations of the sensory identifier.

According to the present invention, the request messages (and any other messages) are not sent to the correlation servers directly, but via the proxy servers 8X and 8Y. That is, the proxy servers receive the messages from the client devices, and route these messages to the appropriate correlation server(s). To this end, each proxy server carries out an analysis of the request messages, as illustrated in FIG. 4. This analysis is primarily based upon a comparison of the representations of the sensory identifier, but may also involve a fingerprint of the event causing the request message.

The analysis carried out by the proxy servers may further involve other items which may be contained in the (request or other) messages, such as a client identification (CI), an application handle, a handling policy and/or a payload. This will later be explained with reference to FIG. 6.

Assuming, for the sake of the example, that the analysis by the proxy servers involves only the representations of sensory identifiers, the proxy servers each forward a received message towards a suitable correlation server, the correlation server being chosen on the basis of the analysis.

The correlation servers can each cover a separate range of representations, for example a frequency range in the case of audio identifiers or a range of code values in the case of image identifiers, the code representing a symbol, such as a bar code. The ranges are preferably overlapping to a certain extent so as to avoid any gaps between the ranges.

If, for example, correlation server A (5A in FIG. 4) is arranged or designated for correlating representations of a first range of audio identifiers (such as tapping sounds), the proxy servers will route request messages containing a representation of this first range to correlation server A. Similarly, correlation server B (5B in FIG. 4) could be arranged or designated for correlating representations of a second range of audio identifiers, while correlation server C (5C in FIG. 4) could be arranged or designated for correlating representations of a third range of identifiers. It is noted that in alternative embodiments, three or more correlation servers can each be dedicated to a particular type of sensory identifier, for example audio identifiers, image identifiers and scent identifiers respectively. In the present example, all three correlation servers are arranged for correlating audio identifiers, but each correlation server is dedicated to a distinct frequency range. There may be some overlap of the frequency ranges, however, this overlap will preferably be small.

In the example of FIG. 4, the first request message RQ1 produced by the (first) client device 1 reaches proxy server 8X, while the second request message RQ1 produced by the (second) client device 2 reaches proxy server 8Y. Which proxy server is reached by a particular message will depend upon the proximity of the client device to a proxy server, the presence of any obstacles in signal paths, and other factors. In some cases, both request messages RQ1 and RQ2 may reach proxy server 8Y while none reaches proxy server 8X, or at least one of the messages may reach both proxy servers.

In all cases, each proxy server analyses the request message(s) it receives and determines the representation (RE1, RE2) of the sensory identifier and, optionally, other parameters such as the client identification (CI1, CI2). The proxy server then forwards the request message to a selected server, this server being selected on the basis of the parameters that the proxy server produced during the analysis of the received request messages. In other words, the parameters resulting from the analysis control the selection of the correlation server. The proxy server 8X produces modified request messages RQ1' and RQ1" which are both based upon the original request message RQ1 but need not be identical to RQ1. For example, some data may have been deleted from the original request message if these data are irrelevant to the subsequent correlation process. Similarly, the proxy server 8Y produces modified request messages RQ2' and RQ" which are both based upon, but not necessarily identical to, the original request message RQ2.

In the present example it will be assumed that the sensory identifier is an audio identifier having three dominant frequencies of 0.4 kHz, 3 kHz and 15 kHz respectively. It will further be assumed that the correlation servers 5A, 5B and 5C are each dedicated to the following audio frequency ranges:
  A: 0.0-1.1 kHz
  B: 1.0-10.1 kHz
  C: 10.0-20.0 kHz.

The (partial) representation relating to the 0.4 kHz dominant frequency will be routed to the first correlation server 5A, the one relating to the 3 kHz dominant frequency to the second correlation server 5B, and the one relating to the 15 kHz dominant frequency to the third correlation server 5C. Assuming that some audio signal distortion and attenuation occurs, particularly at the lower frequencies, no match is found by the first correlation server 5A and the second correlation server 5B. However, the (partial) representations of the 15 kHz component of the sensory identifier are sufficiently similar to produce a match in the third correlation server 5C.

The servers each send a response indicating whether a match has been made, and if this is the case, the response may contain an identification of the matching client device(s). In the example of FIG. 4, a match has been made by the third correlation server 5C which sends an acknowledgement message AC12 to the proxy servers from which the matching (modified) request messages RQ1" and RQ2" were received. The other two correlation servers send "no match" (NM) messages to the respective proxy servers in response to the non-matching (modified) request messages RQ1' and RQ2'. The proxy servers, in return, send acknowledgement messages AC1 and AC2 to the first client device 1 and the second client device 2 respectively. The acknowledgement message AC12 contains the client identifications (CI1 & CI2) of the matching devices, while the acknowledgement messages AC1 and AC2 need to contain only the client identification of the other matching device (message AC1 containing client identification CI2 and vice versa) but may contain both client identifications. In this way, each client device is notified of the other client device(s) with which a match has been made.

A proxy server analyses incoming events (such as "touch events") and routes these events to the relevant correlation server(s) on the basis of one or more of the following items:
Application handle;
Fingerprint vector (which may contain sensory identifier representation data, in addition to event fingerprint data).

The priority of the various elements which may be used for routing (application handle elements and/or fingerprint vector elements) can be previously configured in the proxy server, or sent along in the handling policy.

When routing on the basis of the "fingerprint vector", first an algorithm is applied to determine a characteristic of (a part of) the fingerprint vector. Examples:
When an acoustic fingerprint is used, the dominant frequency in the background noise is determined. The correlation servers are then identified by the frequency band which they serve. The frequency bands should overlap to cover any border frequencies.
When a geographical fingerprint is used, correlation servers are identified by the area they cover. Here too overlap is desired.
When an electromagnetic fingerprint is used, the most powerful received channels are determined. The correlation servers are identified by groups of cell ISs, ranges of MAC addresses, etcetera.
When a physical fingerprint is used, (combinations of) physical parameters are utilised. The correlation servers are then identified by (combinations of) physical parameter values, for example temperature ranges.

The routing algorithm can also utilise combinations of the above parameters.

If the proxy server sends the touch event to more than one correlation server, it will wait until it has received the responses from all servers (or time-out).
When only negative responses are received, then the proxy server combines these responses into a single negative response to the client.
When there is exactly one positive response (and zero or more negative responses), the proxy server sends the positive response to the client.
When several positive responses are received which correspond with each other, then the proxy server combines these into a single positive response to the client.
When several positive responses are received which do no correspond with each other, then the proxy server handles these responses as it is configured, or as instructed in the handling policy provided by the client.
Sends all positive responses to the client, such that the client can resolve any confusion that may have occurred.
Sends a negative response to the client.
Sends possibly also queries to the other clients which whom a match was made.
Etcetera . . . .

For further scaling cascades of proxy servers and/or redirect servers can also be employed. Such cascades are known per se in the field of proxy and redirect servers. The Domain Name System (DNS) for example, used in the Internet and in private networks, utilises proxy and/or redirect servers.

Figure 5:
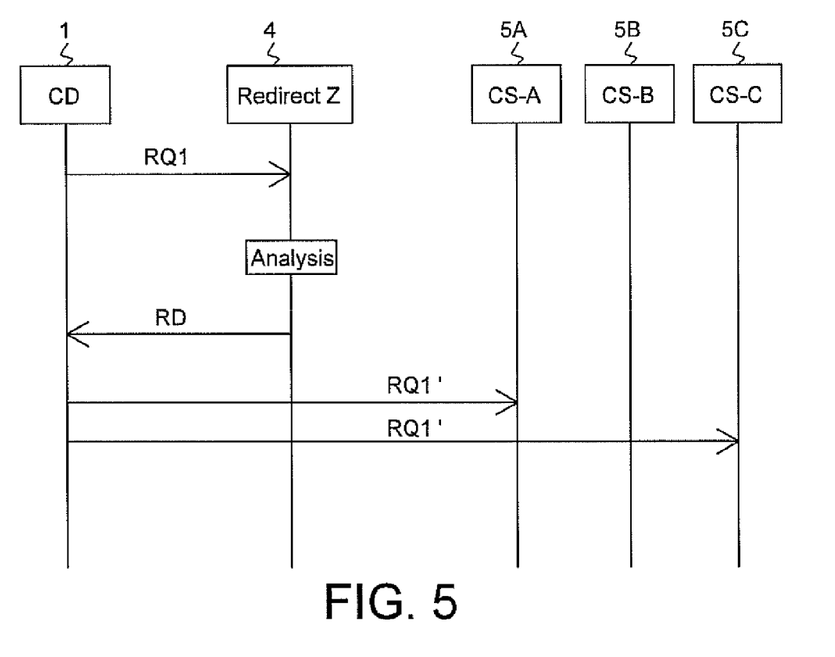
FIG. 5 schematically shows an exemplary exchange of messages in a system according to the present invention when a redirect server is used.

An alternative embodiment is shown in FIG. 5, where a redirect server 4 replaces the proxy servers 8X and 8Y of FIG. 3. In the example of FIG. 5, only a single client device (CD) 1 and only a single redirect server 4 are shown for the sake of simplicity of the drawing.

Similar to the embodiment of FIG. 3, the client device 1 sends a request message RQ1 when it has detected a (sensory) identifier. The redirect server 4 analyses the request message. This analysis can be similar to the analysis carried out by the proxy servers in the example of FIG. 4. However, in contrast to the proxy servers, the redirect server sends a redirect message RD back to the client device instead of forwarding a request message (or producing a modified request message) to one or more correlation servers. This redirect message contains information identifying the correlation server(s) to which the client device has to send the request message. A redirection message may be written as:

RD={CI1, CS-A, CS-C, ...} where CI1 is the identification of client device 1 and CS-A and CS-C identify correlation server 5A and 5C respectively as the correlation servers to which the client device has to send its request message(s).

In response to the redirect message RD, the client device 1 produces a new request message RQ' which contains the information identifying its target correlation server(s). So the new request message RQ' may be written as:

RQ'={CI1, RE1, CS-A, CS-C, ...} where RE1 is the representation of the detected sensory identifier, as before. It is noted that this new request message RQ' may also be split up into two separate new request messages $RQ'_A$ and $RQ'_C$, each being sent to a respective correlation server and preferably containing only the information relevant to that particular server. After receiving the new request message(s), the correlation server(s) will correlate this request message with request messages received from other client devices (not shown).

It will be understood that the embodiments illustrated in FIGS. 3 & 5 may advantageously combined to yield an embodiment comprising both at least one proxy server and at least one redirection server.

Figure 6:
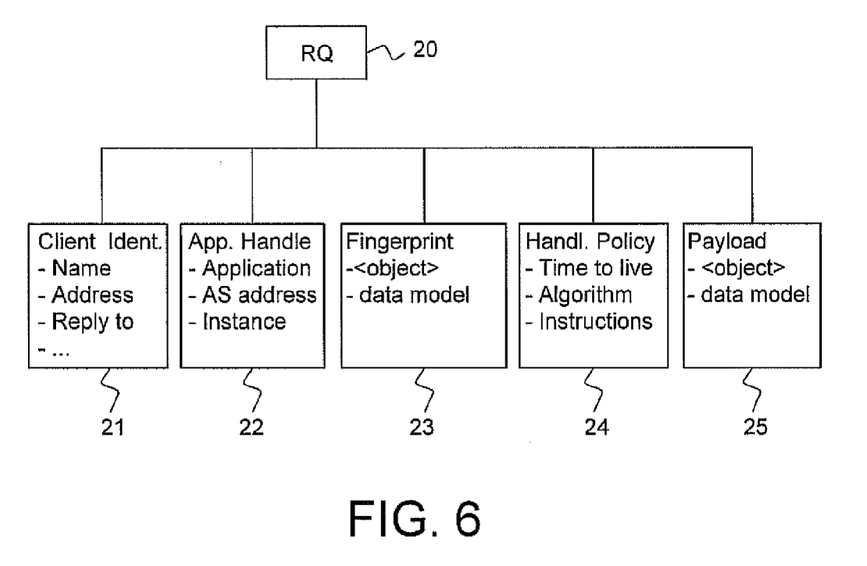
FIG. 6 schematically shows a protocol data model according to the present invention.

The diagram of FIG. 6 illustrates a preferred data model used in the exchange of messages between the client devices, the correlation server(s) and the application server(s), for example according to FIG. 4. In this preferred embodiment, the elements of the protocol between the client devices and the correlation server are data describing an event, such as providing a sensory identifier. The data describing the event are contained in a request message (RQ) 20 and may be constituted by:
  client identity data 21,
  application handle data 22,
  fingerprint data 23 (including sensory identifier representation data),
  handling policy data 24, and/or
  payload data 25.

It is noted that in the model of FIG. 6, the sensory identifier representation data and the event fingerprint data are collectively referred to as fingerprint data 23.

More in particular, the data model comprises:
Client identification (also referred to above as client identification CI):
  "Name", location-independent identification
  "Address": e.g. IP address plus port number
  "Reply-to": e.g. IP address plus port number
  other identity items.
Application handle
  Application identifier
    For example "Stratego", "File", "Business card"
  Application server address
    For example URI or IP address of Stratego Server, plus port number
  Instance identification
    For example "Stratego game Barcelona 3"
Fingerprint vector
  (XML) object on the basis of which the "match is made"
  Fingerprint data model identification
    For example the name of the specific XML scheme for the XML object
Handling policy
  Time-to-live (expiry of data validity)
  Identification of matching/correlation algorithm
    Any additional parameters/criteria
  Additional handling instructions, e.g. security, privacy, integrity, billing, ...
Payload
  (XML) object that is exchanged in case of a positive match.
  Payload data model
    For example a field "plain text".
Additionally, "Null" behaviour may be used if the fields in the data model are not filled in:
"Null" application server address: match is not forwarded to separate application server, but in case of a match payload A goes directly to client B and vice versa.
"Null" fingerprint: match only on the basis of application handle and handling policies.
"Null" time-to-live: default value, e.g. 2 seconds.
Etcetera.

It is noted that the correlation procedure used in the present invention may have alternative embodiments. In a first embodiment, the correlation procedure is stateless: it does not take its history into account. This embodiment has the advantage of simplicity. In a second embodiment, the correlation procedure is stateful: it takes its history into account.

The present invention is based upon the insight that the use of proxy servers and/or redirection servers makes a system for identifying devices scalable and increases its flexibility.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention.

The invention claimed is:

1. A system for identifying a combination of devices that are each arranged for detecting a sensory identifier and transmitting a request message containing a representation of the detected sensory identifier, the system comprising
  a plurality of correlation servers, wherein the correlation servers are distinct from the devices, each correlation server being configured to correlate representations received in the request messages transmitted by different ones of the devices so as to match two or more of those different ones of the devices by determining whether the sensory identifier detected by the devices is the same,
  at least one proxy server for routing the request message from at least one of the devices to at least one selected correlation server, the at least one proxy server being configured to select the routing of each request message dependent on contents of the request message, wherein the at least one proxy server is distinct from the devices and wherein the at least one proxy server selects which of the plurality of correlation servers will correlate representations received from the devices so as to match two or more of those devices.

2. The system according to claim 1, wherein each request message comprises a respective representation of the sensory identifier, and wherein each request message further contains at least one of:
   a client identification for identifying a device,
   an application handle for identifying an application to be run by the device,
   a handling policy indication for identifying a handling policy, and
   a payload for conveying any additional information.

3. The system according to claim 2, wherein each request message further comprises a fingerprint which comprises a representation of environmental information, comprising a temperature, at the location of the device which produced the respective representation of the sensory identifier.

4. The system according to claim 1, wherein the sensory identifier comprises at least one of a sound and an image.

5. A system for identifying a combination of devices that are each arranged for detecting a sensory identifier and transmitting a request message containing a representation of the detected sensory identifier, the system comprising
   a plurality of correlation servers, wherein the correlation servers are distinct from the devices, each correlation server being configured to correlate representations received in the request messages transmitted by different ones of the devices so as to match two or more of those different ones of the devices by determining whether the sensory identifier detected by the devices is the same,
   a redirection server arranged for redirecting request messages back to the device while providing routing information for routing the request message from at least one of the devices to at least one selected correlation server, the redirection server being configured to select the routing of each request message dependent on contents of the request message.

6. The system according to claim 1, arranged for matching devices which are in each other's proximity.

7. The system according to claim 1, wherein the devices are mobile devices.

8. The system according to claim 1, further comprising at least one application server for carrying out an application involving matching devices.

9. The system according claim 8, wherein the at least one application server is arranged for communicating with the devices through a correlation server.

10. A proxy server that is distinct from a combination of devices, wherein the proxy server in combination with a plurality of correlation servers provides a system for identifying the combination of devices,
   wherein the devices are each arranged for detecting a sensory identifier and transmitting a request message containing a representation of the detected sensory identifier;
   wherein each of the plurality of correlation servers are distinct from the devices and are configured to correlate representations received in the request messages transmitted by different ones of the devices so as to match two or more of those different ones of the devices by determining whether the sensory identifier detected by the devices is the same;
   wherein the proxy server is distinct from the devices and configured for routing the request message from at least one of the devices to at least one selected correlation server, the proxy server configured to select, dependent on contents of the request message, which of the plurality of correlation servers will correlate representations received from the devices so as to match two or more of those devices, the proxy server.

11. A method of identifying a combination of devices that are each arranged for detecting a sensory identifier and transmitting a request message containing a representation of the detected sensory identifier, the method comprising:
   using selectable ones of a plurality of correlation servers to correlate representations received in the request messages transmitted by the devices so as to match two or more different ones of those devices by determining whether the sensory identifier detected by the different ones of the devices is the same, the correlation servers being distinct from the devices; and
   routing the request message from at least one of the devices to at least one correlation server using at least one proxy server, the proxy server being configured to select the routing of each request message dependent on contents of the request message, and the at least one proxy server being distinct from the devices.

12. The method according to claim 11, wherein each request message comprises a respective representation of the sensory identifier, and wherein each request message further contains at least one of:
   a client identification for identifying a device,
   an application handle for identifying an application to be run by the device,
   a handling policy indication for identifying a handling policy, and
   a payload for conveying any additional information.

13. The method according to claim 12, wherein each request message further comprises a fingerprint which comprises a representation of environmental information at the location of the device which produced the respective representation of the sensory identifier.

14. The method according to claim 11, wherein the sensory identifier comprises at least one of a sound and an image.

15. A non-transitory computer readable medium storing computer executable instructions that, when executed, perform the method according to claim 11.

* * * * *